United States Patent [19]

Gundlach

[11] Patent Number: 5,279,526
[45] Date of Patent: Jan. 18, 1994

[54] REPLACEABLE SPROCKET WHEEL ASSEMBLY FOR MODULAR LINK BELT SYSTEMS

[75] Inventor: James O. Gundlach, New Orleans, La.

[73] Assignee: The Laitram Corporation, New Orleans, La.

[21] Appl. No.: 978,721

[22] Filed: Nov. 19, 1992

[51] Int. Cl.$^5$ ............................................. F16H 55/30
[52] U.S. Cl. ......................................... 474/95; 474/96
[58] Field of Search ........................................ 474/95–

[56] References Cited

U.S. PATENT DOCUMENTS

| | | |
|---|---|---|
| 184,540 | 11/1876 | Mills. |
| 519,331 | 5/1894 | Hodge .................................... 474/95 |
| 531,820 | 1/1895 | Williams. |
| 1,391,719 | 9/1921 | Conyngham. |
| 4,964,842 | 10/1990 | Howard ............................. 474/96 X |

Primary Examiner—Thuy M. Bui
Attorney, Agent, or Firm—Laurence R. Brown; James T. Cronvich

[57] ABSTRACT

Sprocket wheels for modular plastic link belts are made in two mating halves for expediting removal perpendicularly away from a coaxial drive shaft about which they are supported without disassembly of the shaft. To assure axial alignment and stability of the mating parts overlap joints between the parts are formed by securing together in surface contact laminar flange extensions from respective sprocket wheel halves joined in driving relationship about an inner shaft to form a completed sprocket wheel assembly. For critical use in food and chemical environments, the entire sprocket assembly is made of plastic, including binding clamps for holding the two mated flange surfaces of different halves together.

21 Claims, 2 Drawing Sheets

REPLACEABLE SPROCKET WHEEL ASSEMBLY FOR MODULAR LINK BELT SYSTEMS

TECHNICAL FIELD

This invention relates to modular link belt drive systems, and more particularly it relates to two part sprocket wheel assemblies that permit assembly on and removal from an in-situ drive shaft.

BACKGROUND ART

Two piece sprocket and pulley wheels adapted for removal from an in place drive shaft in general are well known in the art. Thus, Mills, U.S. Pat. No. 184,540, Nov. 21, 1876 shows a sprocket wheel with a sector dovetailed for axial displacement to expose the driveshaft so that both parts may be removed. This construction has the disadvantages that removal cannot take place in restricted mounting positions without room for axial movement to disassemble the parts, and the dovetail mortise-tenon joint imposes difficult to meet manufacturing tolerances, such that for example, could not easily be attained with inexpensive plastic injection molded parts.

Williams, U.S. Pat. No. 531,820, Jan. 1, 1895 bolts in place a removable sprocket wheel sector just wide enough to move a larger mating portion over the drive shaft. Such smaller sectors tend to unbalance the sprocket wheel, as does the bolting of the small sector to the sprocket wheel rim and hub. Also this construction is only adaptable to a spoked sprocket wheel configuration and requires a significant amount of axial spacing to employ wrenches for disassembly.

Conyngham, U.S. Pat. No. 1,391,719, Sep. 27, 1921 has two half sprockets with circumferential flange extensions about the shaft. The two halves are bolted together through the flange extensions at a hub extending axially away from the sprocket wheel. The bolts also serve to axially lock the wheel in place on the shaft. Not only is the construction of the circumferential flange extensions costly, critical and delicate, but the hub prevents use where side by side sprocket wheels are desired such as in driving modular link belt systems. Also, this construction is inconsistent with the requirement of sprockets in modular link belt drive systems to wander axially on the shaft to conform with dynamic conditions encountered in operation.

Accordingly the prior art has not provided two part sprocket wheels that are readily removable from the shaft of a nature that meets the requirements encountered in a modular link belt drive system. Thus it is an objective to improve the state of the prior art by providing split sprocket wheels particularly adapted for solving the problems encountered in modular link belt drive systems.

DISCLOSURE OF THE INVENTION

Two generally semi-cylindrical sprocket wheel sector parts (halves) exposing (when separated) a coaxial aperture for engaging a drive shaft mate about a modular link belt drive shaft, typically square, and are bound together removably so that the sprocket wheels can be removed and replaced in service without disassembling the shaft. The respective sectors have joining edges forming interleaving flanges of reduced thickness, typically substantially flat panels, which overlap in mating registration to form a joint. Such joints may comprise two or three interleaved flanges, which serve to mate the parts in exact relative axial registration along the drive shaft they encompass.

In one embodiment, a single panel flange, typically of half sprocket wheel thickness at two sector edges, is arranged on opposite sides of the sprocket wheel. When mated about the shaft, the parts are bound in place to form a unitary sprocket wheel by fasteners. The fasteners may be metal screws or bolts extending through the preferably plastic sprocket wheel flanges at an overlap region near the rim of the sprocket wheel for axial access for removal. However, for closely confined sprocket wheels having little axial working room, the flanges are bound together by a radial rod or peg inserted substantially radially from the sprocket wheel outer circumference, and pinned to the flanges near the rim to keep from being dislodged by centrifugal force. The rod-peg has a reduced diameter waist section in the vicinity of two mated-in-contact flange surfaces from different sprocket wheel parts leading into an integral outer contour, to form typically a figure 8 shape, or a mid-section truncated slice thereof. This rod mates into a bore or groove formed into the sprocket wheel parts so that the two parts are axially bound together to form a unitary sprocket wheel. This construction is preferably solely of plastic particularly suitable for critical operation requirements in conveyor belts demanding non-metal parts, such as used for food and chemical processing.

Other joint configurations may vary in structure, such as obtained by interleaving three flanges at each joint. Preferably the final assembly provides a balanced sprocket wheel assembly. Also the joint and sprocket wheel configuration should be able to wander axially along the shaft without being fixed axially in place for dynamically conforming with conditions such as loading, curves, etc. occurring during belt use. Throughout the following description, drawings and claims, there will be found further objects, features and advantages of the invention.

BRIEF DESCRIPTION OF THE DRAWINGS

In the accompanying drawings, wherein like reference characters appearing in the different views identify similar features to facilitate comparison with prime (') notation indicating minor variations.

THE PREFERRED EMBODIMENTS

Figure 1:
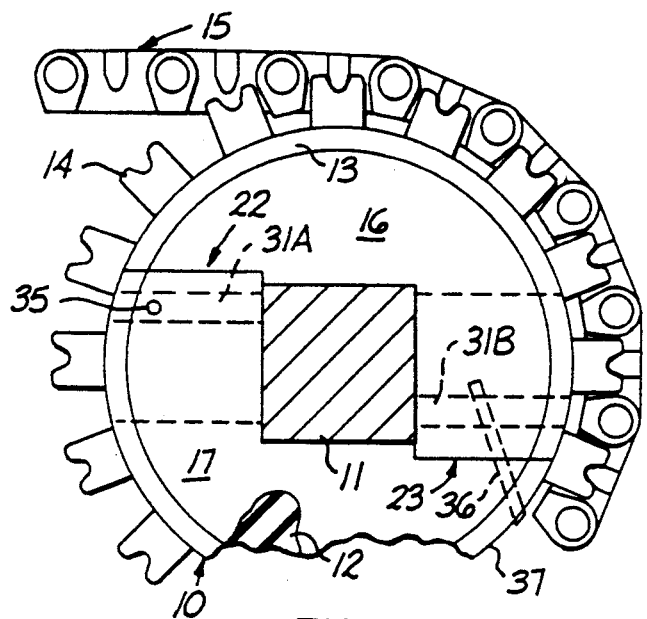
FIG. 1 is a fragmental side view sketch of a modular link belt drive system embodying the removable sprocket feature of this invention.
Figure 2:
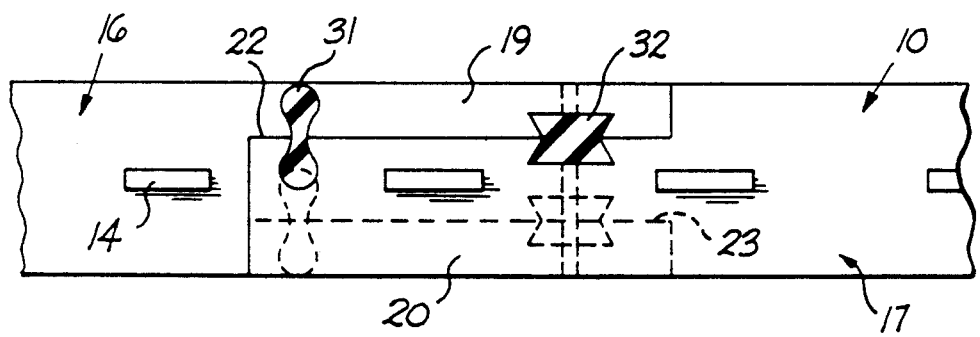
FIG. 2 is a side view sketch of the sprocket shown in FIG. 1, looking into the outer circumference, for illustrating substantially radially inserted and removable rods for binding flanges on two mating sprocket parts together to form a unitary sprocket wheel assembly.
Figure 4:
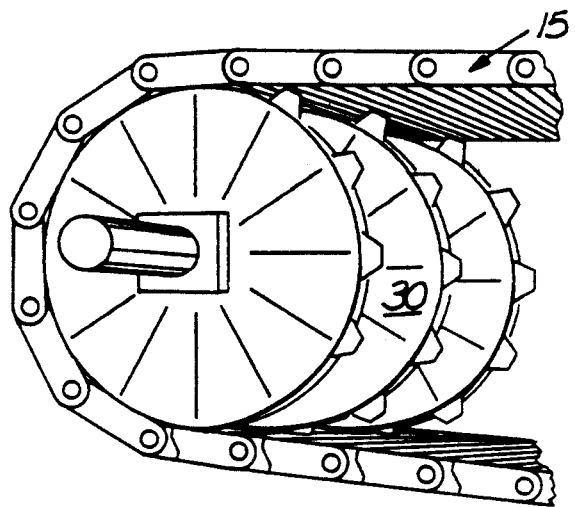
FIG. 4 is a fragmentary sketch of a modular plastic link belt drive system having a plurality of plastic sprocket wheels aligned in spaced position along a drive shaft upon which internally disposed sprocket wheels may be removably mounted in accordance with this invention for replacement without disassembling the shaft.

Now with reference to the drawings, one sprocket wheel embodiment of this invention is shown respectively in FIGS. 1 and 2 in side and circumferential views, partly in section to indicate structural materials. This sprocket wheel 10 is of the disc type without any prominent extending hub structure. However, the configuration of the sprocket wheel can be varied significantly, and those features significant to the present invention are emphasized hereinafter. This particular hubless disc type of sprocket wheel may be disposed side by side, rather than spaced over the width of a belt as shown in the embodiment of FIG. 4. Thus, it is important to produce a sprocket wheel that can be removed from a drive shaft 11 without shaft disassembly when there is little axial working space along the shaft between side by side sprocket wheels.

The sprocket wheel 10 is preferably made solely of plastic, as shown at the broken away region 12, and therefore adapted for critical environmental usage, such as found in food and chemical industries, where the presence of metal may be viewed as a contaminant. The presence of a rim 13 is not significant, unless it is desirable to have a thinner, lighter weight sprocket wheel with less plastic, exhibiting less inertia to induce wear between the sprocket teeth 14 and accompanying belt 15 during start up or stopping of the drive system to rotate shaft 11.

Figure 3:
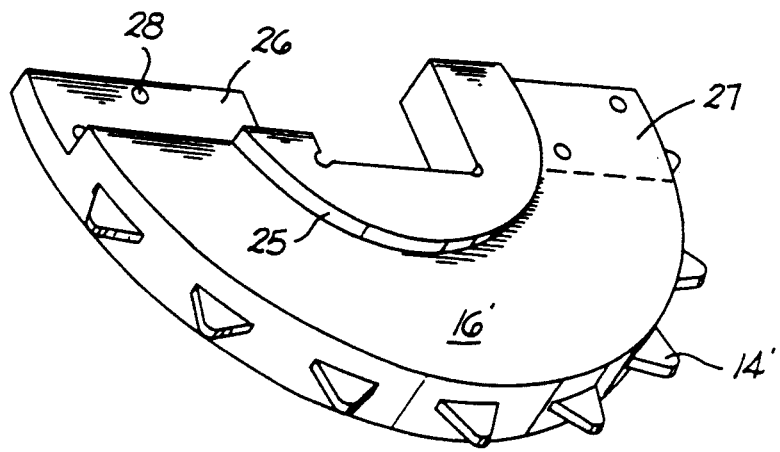
FIG. 3 is a perspective view of a sprocket sector part embodiment of the invention with flanges near the rim at the two edges respectively disposed on opposite faces of the sprocket wheel.

The sprocket wheel 10 is made up of two sector parts 16 and 17, preferably substantially semi-cylindrical, with extending flat panel like flanges 19, 20 disposed at the two sector radial edges near the circumferential rim of the sprocket wheel to overlap at the joints 22, 23 when the two parts are mated about the drive shaft 11. The flanges 19, 20 need not necessarily be half the thickness of the sprocket wheel disc as seen in FIG. 2, nor devoid of such side wall patterns as appear in FIG. 4, provided that flat surfaces are disposed for mutual contact at the mating overlapped joints 22, 23. Also, as seen better from the FIG. 3 perspective view, a hub 25 may be provided and there is an advantage if the flanges 26, 27 on the part 16' are disposed on opposite faces of the sprocket wheel. Thus, axial positioning (along the drive shaft) of the two parts 16, 17 forming a sprocket wheel is retained in place. In this embodiment the flanges are bound together by screws or bolts located in the respective bores 28 through the flanges. These bolts are axially oriented, but near the sprocket wheel circumferential rim, so that they may be reached for removal with an appropriate tool such as a bent end screwdriver or wrench in such locations as the middle sprocket wheel 30 of FIG. 4.

However, the structure for binding the two parts together at the flange regions 22, 23 of FIGS. 1 and 2 is available radially from the circumferential surface of the sprocket wheel 10. Thus, attention is directed to the alternative rods or pegs 31, 32 of FIG. 2, with the reduced waistband configuration of a figure 8 cross section 31 and alternative truncated intermediate portion 32 respectively, for example. Thus the two flanges 19 and 20 are forced and bound together into a substantially integral sprocket wheel assembly forming the sprocket wheel configuration from two mated sector parts 16, 17 between which the rods 31, 32 are forced into the sprocket wheel body substantially radially from the circumferential rim of the sprocket wheel.

As may be seen from FIG. 1, the binding pegs 31 are held radially in place by a peg 35 axially directed through the flanges (19, 20) when there is lateral (axial) room for removal, or alternatively by the obliquely oriented pin 36 accessible from the circumferential rim 37 of the sprocket wheel 10.

Figure 5:
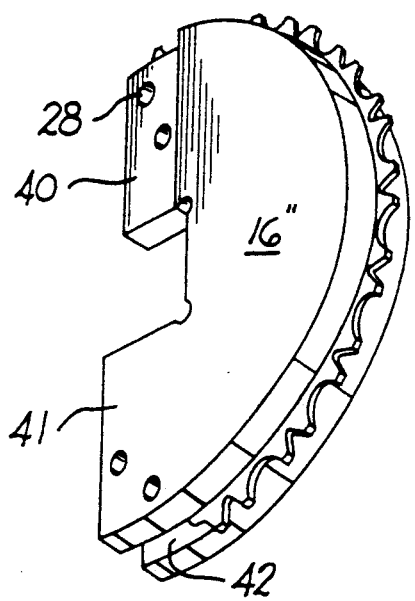
FIG. 5 is a perspective sketch of a further sprocket wheel sector embodiment of this invention that forms interleaved mating joints having three flanges.

As seen from the sprocket wheel sectorial part 16" of FIG. 5, there are three flanges 40, 41 and 42 that interleave in a tongue-in-groove mating position with an opposite sectorial part (not shown). Thus, as located on the two edges of the sectorial part 16, the flanges 40, 41, 42 each constitute substantially flat panels substantially one-third the thickness of the sprocket wheel disc.

Figure 6:
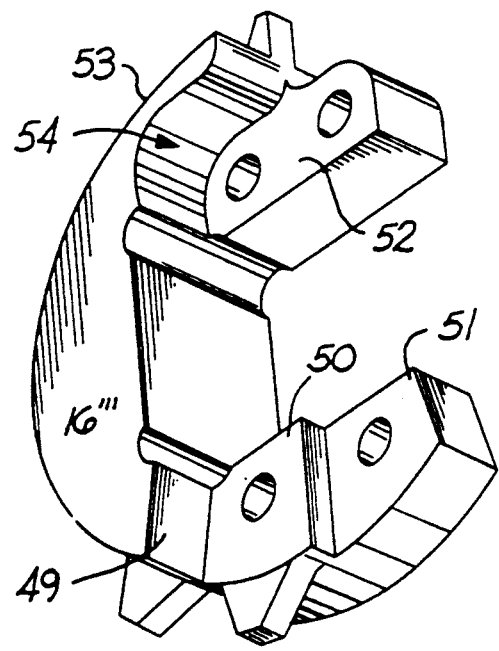
FIG. 6 is a further perspective sketch of a sprocket wheel sector embodiment having modified mating joint structure.

Another sprocket wheel part 16''' embodiment is shown in FIG. 6 to illustrate further features that may be incorporated in such substantially hemi-cylindrical mating sprocket wheel parts. The overlapping flange portion at the bottom has three layers 49, 50, 51 which abut with mating flange structure in the (unshown) mating part. Only one flange layer 52 is provided for the uppermost edge portion of the sectorial part 16'''. Note that there is a circumferentially extending flange rim portion 53, with an inner face 54. When this is assembled on the coaxially positioned drive shaft and mated the circumferential flange 53 any tendency for the parts to slide in a vertical direction as shown is precluded, if the sprocket wheel central aperture becomes worn or loosely fits on the coaxially disposed driving shaft.

It is therefore shown that this invention has advanced the state of the art, and provides removable sprocket wheel assemblies comprising two sectorial mating parts that are particularly adapted for use in plastic modular link conveyor belt systems. Therefore those novel features defining the spirit and nature of the invention are defined with particularity in the following claims.

I claim:

1. A part for a sprocket wheel assembly for mounting upon a drive shaft for a modular link belt, wherein the assembly has separable sprocket wheel parts removably positioned about the drive shaft in a configuration permitting removal of the sprocket wheel parts from an in-situ drive shaft in a direction perpendicular to the shaft comprising in combination:

a sprocket wheel sectorial part for mating with a drive shaft to interfit with a further sprocket wheel sectorial part to thereby constitute a unitary sprocket drive wheel assembly of substantially cylindrical peripheral shape having sprocket teeth disposed circumferentially thereabout for driving said belt, said sprocket wheel part having interfittable flanges thinner than said wheel extending near the wheel circumference from two interfitting sector extremities disposed substantially radially inwardly toward the shaft, said flanges being adapted to meet mating flanges on said further sprocket wheel part in an overlapping mated joint to form a complete sprocket wheel disposed about an axis.

2. The sprocket wheel part defined in claim 1 wherein the flanges further comprise, at least one substantially flat panel member extending from the two extremities on opposing faces of the sprocket wheel.

3. The sprocket wheel part of claim 2 interfitted with a mating part to constitute a sprocket wheel assembly disposed about the shaft.

4. The sprocket wheel of claim 3 having disposed radially thereinto from the sprocket wheel circumference at a position overlapping two interfitted joint members respectively from two separate sprocket wheel parts a bore shaped to receive a rod that engages each of the parts to bind them together.

5. The sprocket wheel of claim 4 having a mating rod within the bore binding the two interfitted joint members together.

6. The sprocket wheel of claim 5 consisting of plastic parts.

7. The sprocket wheel of claim 4 further comprising a bore of a figure 8 configuration.

8. The sprocket wheel of claim 4 further comprising a bore having a waist portion of restricted width positioned substantially at a joining surface of two joint members.

9. The sprocket wheel part of claim 2 wherein one joint member comprises two spaced said flanges extending from opposite wheel sides, and the other joint member has a single said flange extending from an intermediate position between opposite wheel faces.

10. The sprocket wheel part of claim 2 wherein the flanges respectively comprise panel members extending from opposite wheel surfaces.

11. The sprocket wheel part of claim 2 wherein the flanges respectively comprise panel members extending from the same wheel surface.

12. A sprocket wheel comprising in combination, two mating parts each adapted (a) to mate on a drive shaft (b) to move toward and away from the shaft in a direction perpendicular to the shaft (c) to mate at circumferentially disposed flanges in surface contact with mating flanges on a mating part, and substantially radially disposed interlocking structure accessible from the sprocket wheel circumference comprising a bore and a rod for binding the flanges together in said surface contact.

13. The sprocket wheel of claim 12 made solely of plastic.

14. A sprocket wheel comprising in combination,
two wheel parts at circumferential positions thereon respectively having inwardly extending flat planar flanges mated in driving relationship on a driving shaft to produce a circumferential portion comprising two overlapping flange joints on the respective parts to form a unitary sprocket wheel.

15. The sprocket wheel of claim 14, wherein the overlapping flange joints further comprise substantially flat panels extending partly through the thickness of the sprocket wheel near the circumference thereof.

16. The sprocket wheel of claim 15 wherein two flanges on each part are respectively disposed on opposite sides of the sprocket wheel.

17. The sprocket wheel of claim 14 wherein the two parts are held together by means of a radially disposed clamping member engaging surfaces of the two parts at joints between the flanges.

18. The sprocket wheel of claim 15 wherein each part contains a total of two said flanges.

19. The sprocket wheel of claim 5 with circumferential sprocket teeth about the wheel circumference in engagement with a plastic modular link belt, and disposed on a drive shaft for rotation therewith in a mode permitting a degree of axial movement of the sprocket wheel along the shaft wherein said rods are interspersed between sprocket teeth.

20. The sprocket wheel of claim 14 wherein each joint interlocks a total of two flanges, one extending from each of the two parts.

21. The sprocket wheel of claim 14 wherein the two parts are held together by bolts extending through the flanges.

* * * * *